United States Patent [19]

Moseley

[11] 4,054,211

[45] Oct. 18, 1977

[54] LUMBER STACKING APPARATUS AND METHOD

[76] Inventor: Kemper N. Moseley, 1400 Camden St., Durham, N.C. 27704

[21] Appl. No.: 744,436

[22] Filed: Nov. 23, 1976

[51] Int. Cl.$^2$ .......................... B65G 57/10; B65G 57/18
[52] U.S. Cl. ................................... 214/6 M; 198/722; 214/6 F; 214/152
[58] Field of Search .......... 214/6 M, 6 F, 6 H, 6 DK, 214/152; 198/471, 642, 489, 490, 722

[56] References Cited

U.S. PATENT DOCUMENTS

| | | | |
|---|---|---|---|
| 3,213,999 | 10/1965 | Williams | 198/489 |
| 3,508,672 | 4/1970 | Stanoy et al. | 214/41 |
| 3,610,443 | 10/1971 | Berge et al. | 214/6 DK |
| 3,874,521 | 4/1975 | Lunden | 214/6 DK |
| 3,912,254 | 10/1975 | Woodruff | 214/6 H X |

FOREIGN PATENT DOCUMENTS

| | | | |
|---|---|---|---|
| 1,044,716 | 11/1958 | Germany | 214/6 H |
| 136,384 | 7/1952 | Sweden | 214/6 H |

*Primary Examiner*—L. J. Paperner
*Attorney, Agent, or Firm*—B. B. Olive

[57] ABSTRACT

A push-on type lumber stacker is operated such that each layer of boards is formed directly upon the package of stacked lumber. A plurality of rotary driven cam discs aligned transverse to the longitudinal axes of the boards push individual boards onto the package. The cams are shaped so as to push forward and downward on the trailing edge of the boards. The stacking sticks used to separate the boards are inserted at spaced intervals into stick holders so that the lumber may slide over the stick holders and then onto the sticks as the layers are made.

6 Claims, 10 Drawing Figures

LUMBER STACKING APPARATUS AND METHOD

BACKGROUND OF THE INVENTION

1. Field of the Invention

The invention relates to an apparatus and method for stacking elongated articles in spaced layers. In particular, the invention relates to a push-on type apparatus and method for stacking lumber utilizing a rotary cam drive mechanism.

2. Description of the Prior Art

The lumber industry throughout the world has become highly mechanized in recent years to a point that the most time consuming operation presently is the stacking of lumber after it has been sawed at the sawmill. The term "stacking" refers to the laying of a predetermined number of boards of horizontal supports thus forming layers or courses of lumber. The time-honored manual method of stacking lumber has been to first form a bottom layer of boards upon a support and then to successively form additional layers which are spaced apart by stacking sticks, or check sticks as they are commonly called. The stacking sticks are manually placed across the top of each layer of boards with predetermined spaces between them, usually 2 by 4 feet. The manual placing of lumber and stacking sticks in alternating layers is continued until the package of lumber is at the desired height.

In recent years mechanical lumber stackers have gained acceptance in large sawmills. The prior art stackers generally operate as follows: Lumber is placed on a haul-up which delivers it to an unscrambler such as described in U.S. Pat. No. 3,204,753. The unscrambler untangles the lumber and conveys it up an incline where it delivers individual boards to a horizontal conveyor known as a course maker. A complete layer of boards is made up on this course maker. A mechanized set of arms rise under the layer of boards, pick it up and move it out over the package of lumber. These arms then lower to a point where a stop prevents the back edge of this layer of boards from returning to the course maker and the arms retract thereby depositing the layer of boards on the package. A lumber stacker of this general type is described in U.S. Pat. No. 3,743,113. In this type operation, the stacking sticks may be placed loosely in U-shaped holders on each side of the stack since the layer of boards is being placed onto the sticks and not slid over the sticks. Although the above-described lumber stackers have been available for several years and many have been in operation in high-production sawmills throughout the world, the price of these machines is extremely high thereby prohibiting their economical use in small and medium-sized sawmills. Furthermore, these arm-type stackers must be made extremely large and must support huge loads when stacking long boards, e.g., 30 to 40 feet. Therefore, it becomes an object of the present invention to provide a lumber stacking apparatus which may be economically produced and is suitable for small and medium-sized sawmills and which may be used to stack long boards as efficiently as short boards.

In regard to the cam drive mechanism of the present invention, it should be noted that it has been proposed to load ties utilizing a rotatable cam-type element which is specifically contoured to contact the side of the tie and impart a substantially uniform acceleration to the tie as it is loaded. Such a tie loader is described in U.S. Pat. No. 3,508,672. The cam disclosed in this patent is shaped somewhat like a "beaver tail" and is primarily adapted for imparting a constant acceleration to the tie. The force vector at the contact surface between the cam and the side of the tie is not at a constant angle with the vertical, but rather changes directions substantially during the momentary pushing operation. If such a cam shape were utilized to drive lumber onto a package, indications are that it would frequently cause the boards to rise over the cam or "buckle" due to the resistance caused by the lumber already on the package.

SUMMARY OF THE INVENTION

According to the apparatus and method of the present invention, a bulk supply of boards is separated into individual boards. The boards are then stacked into a package of lumber having layers of boards separated by stacking sticks. The individual boards are conveyed horizontally on a deck at evenly-spaced intervals by a plurality of parallel chain conveyors. At the terminal edge of the deck are positioned at least two aligned rotary cam discs which rotate on the same horizontal drive shaft that drives the chain sprockets. The cam discs are synchronized with the chain movements so that they engage the trailing edge of each board and propel the board off the deck and onto a lumber-stacking base. After a layer of boards is completed in this manner, the stacker base indexes downwardly, a number of stacking sticks are inserted and the next successive layer is begun. During the stacking operation, the ends of the stacking sticks proximate the cams are securely held in place by a series of stick holders. The stacking sticks serve to support and guide the boards as the layers are formed and serve to space the layers of boards in the completed package. An additional feature of the invention is an apparatus for rolling the completed package away from the stacking apparatus.

DESCRIPTION OF THE PREFERRED EMBODIMENT

Figure 1:
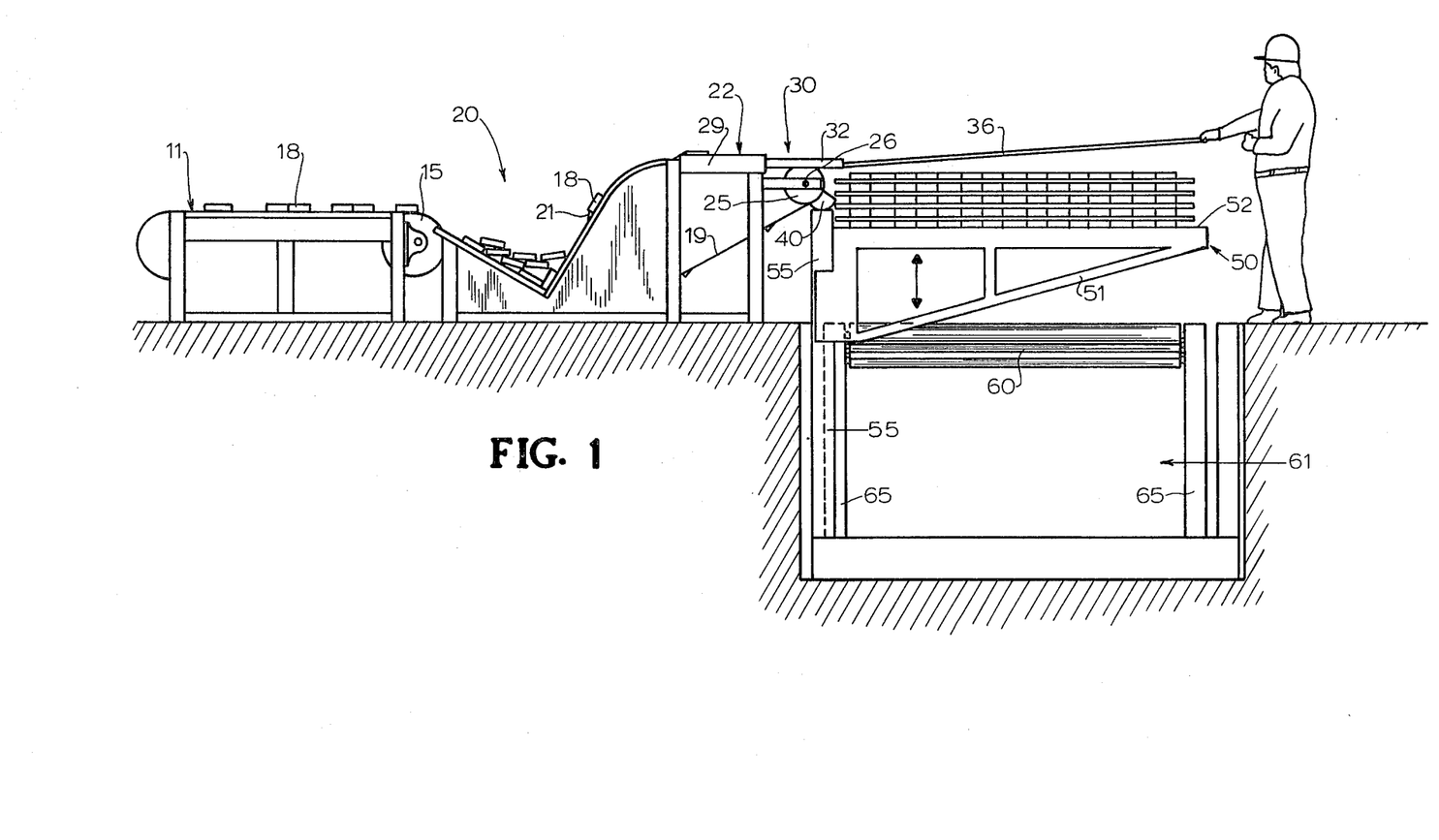
FIG. 1 is a side elevation view of a lumber preparation system incorporating the lumber stacking apparatus of the present invention. The stacker is shown as the stacking sticks are being inserted into their respective stick holders preparatory to beginning a new layer of boards.
Figure 2:
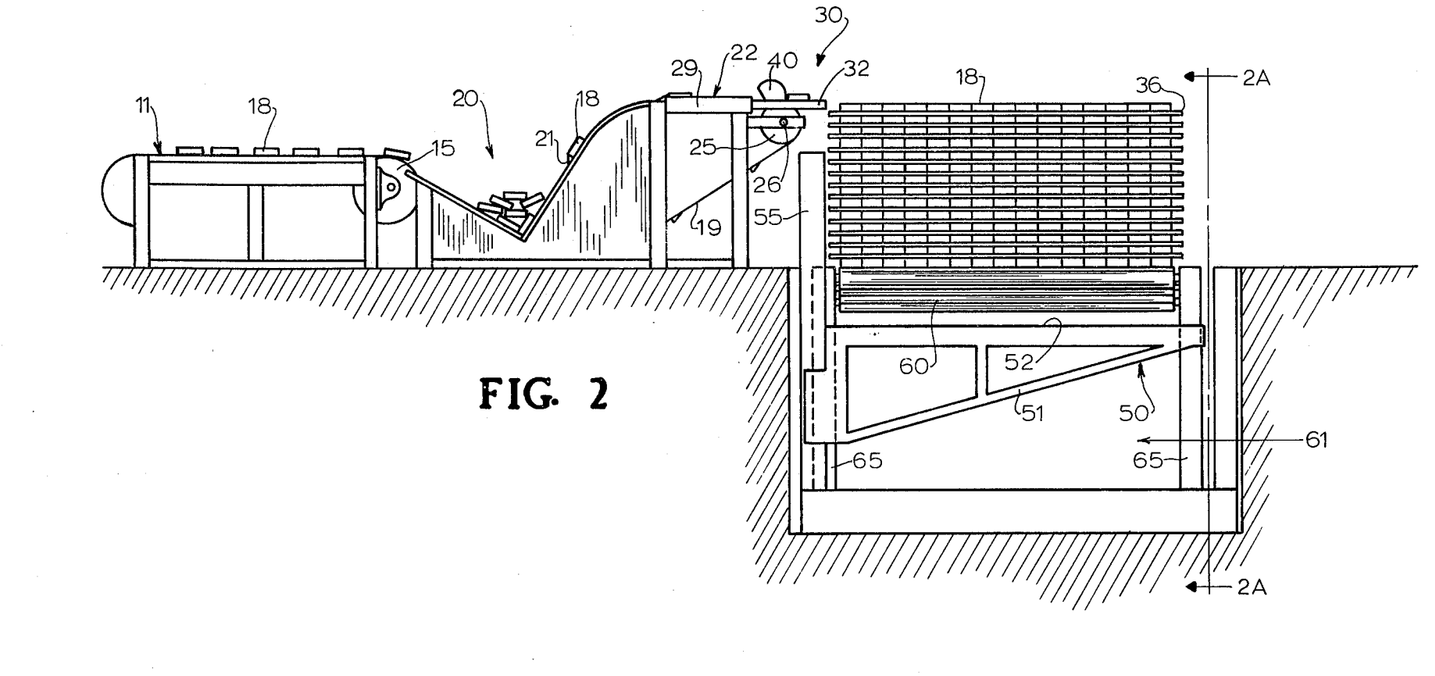
FIG. 2 is a view similar to FIG. 1 showing the stacker base lowered below the level of the rollers and with the completed package of lumber beginning to roll away from the stacking apparatus.
Figure 3:
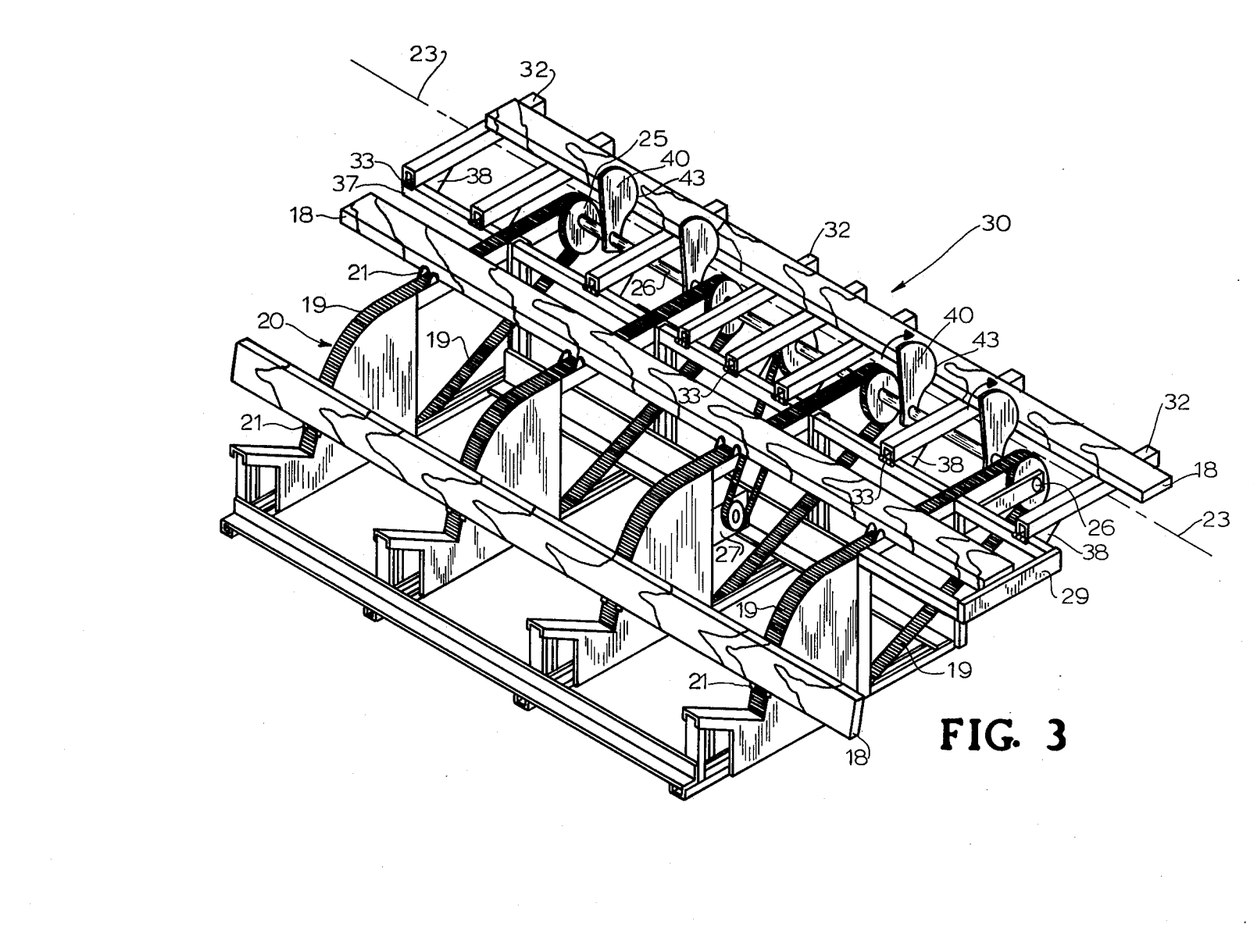
FIG. 3 is a perspective view of the portion of the stacking apparatus incorporating the chain conveyor, cams and stick holders.

Referring to the drawings and in particular to FIGS. 1–3, the apparatus of the present invention comprises a lumber deck 11, an unscrambler 20, a lumber stacker 30, and vertically movable lumber stacker base 50. Lumber deck 11 and unscrambler 20 are generally of the type disclosed in previously-mentioned U.S. Pat. No. 3,204,753, issued Sept. 7, 1965, to Kemper N. Moseley, the teachings of which are incorporated herein by reference. According to the well-known operation of deck 11 and unscrambler 20, a bulk supply of boards 18 is placed on deck 11 and moved therealong until such boards are discharged from the end of deck 11 where they move over a sprocket 15 and fall by gravity into the V-shaped portion of unscrambler 20. A series of parallel chains 19, each having upwardly extending spaced lugs 21, pass under the boards and remove individual boards from the V-shaped portion. The boards are then transferred upwardly onto a second horizontal deck 22 where they are conveyed in a direction transverse to their longitudinal axes and are discharged from deck 22 at the deck terminal edge portion 23, i.e., at the line connecting the upper surfaces of drive sprockets 25 (see FIG. 3). For the purposes of the present invention, the individual boards are conveyed from the terminal portion 23 of deck 22 to the lumber stacking area. The chains 19 are adapted to be driven by a plurality of drive sprockets 25 mounted on a horizontal drive shaft 26 which is, in turn, driven by a motor 27 through appropriate transmission means. All chains 19 are synchronized to move at the same rate of speed. Further details of the lumber deck 11 and unscrambler 20 may be found in the above-mentioned U.S. Pat. No. 3,204,753 and will not be repeated here.

In the preferred embodiment, stacker base 50 does not have a single upper flat surface for supporting the bottom layer of boards in the package; rather, stacker base 50 consists of a series of five spaced cantilevered support arms 51 which together provide five horizontally aligned top support surfaces 52. The aligned top surfaces 52 collectively comprise what is referred to herein as the "stacker base." As discussed later, the construction of the stacker base 50 and the spacing between the support arms 51 are critical to the rolling of the completed packages of lumber away from the stacking area. Stacker base 50 is moved upwardly and downwardly by sliding the support arms 51 within respective vertical tracks 55. Operator controls (not shown) are provided for moving the supports 51 during the stacking operation.

Figure 4:
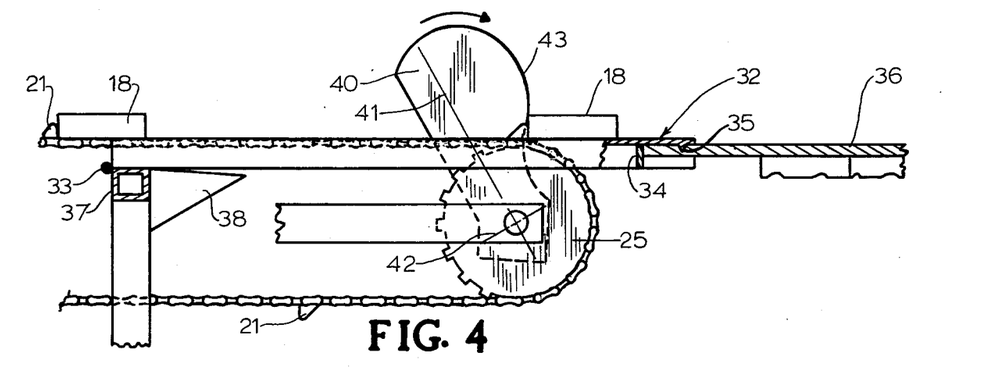
FIG. 4 is an enlarged fragmentary side view of one of the cams and an associated stick holder with the cam positioned as a cam surface line of contact initially engages the trailing upper edge-corner of a board.

With primary reference to FIG. 3, the propelling mechanism for moving the individual boards 18 from deck 22 to form layers of boards on stacker base 50 will be described. Four vertically oriented cam discs 40 are affixed to drive shaft 26 for common rotation with sprockets 25. Each cam disc 40 has a major axis 41 and a minor axis 42 (see FIG. 4) and is mounted on shaft 26 so that during a fractional part of each revolution thereof the elongated portion of cam disc 40 protrudes above deck 22. The cam discs 40 rotate with sprockets 25 in the direction indicated by the arrows in FIG. 3. Each cam disc 40 has a forwardly facing curved camming surface 43 which engages the trailing edge of each board 18 as the board approaches the deck terminal edge portion 23. The spacing between lugs 21 is uniform so that boards 18 are conveyed into position above cam discs 40 at regular intervals. In the preferred embodiment, lugs 21 are spaced apart by a distance equal to the circumference of the sprockets 25. Thus, during one revolution of the sprockets 25 (which corresponds to one revolution of the cam discs 40), one aligned set of lugs 21 conveys an individual board to the propelling mechanism. The positioning of cam discs 40 on shaft 26 is synchronized with the positioning of lugs 21 so that as each individual board approaches the deck terminal portion 23 the major axes 41 of cam discs 40 are substantially horizontal and the boards may pass over the cam discs 40 without interference. After a board passes over the sprockets 25 to the position shown in FIG. 4, the continued rotation of cam discs 40 causes the camming surfaces 43 to contact the trailing edges of the board and propel it forwardly onto the stack. FIG. 4 represents the position where the camming surfaces 43 are initially contacting the board 18. The camming surfaces continue to impart a propelling froce to the trailing edge of board 18 until the board moves out of contact with the camming surfces 43 at the position shown in FIG. 5. In the preferred embodiment, the camming surfaces 43 have a shape designed to impart a resultant force on the trailing edges of the board at an angle somewhat downward from horizontal. An angle of approximately 25 degrees downward from the horizontal has been found to give excellent results. The size of this angle is not critical provided that a sufficient downward force is exerted so that the boards will not rise up and over the cam, that is, so that the boards will not "buckle."

Figure 5:
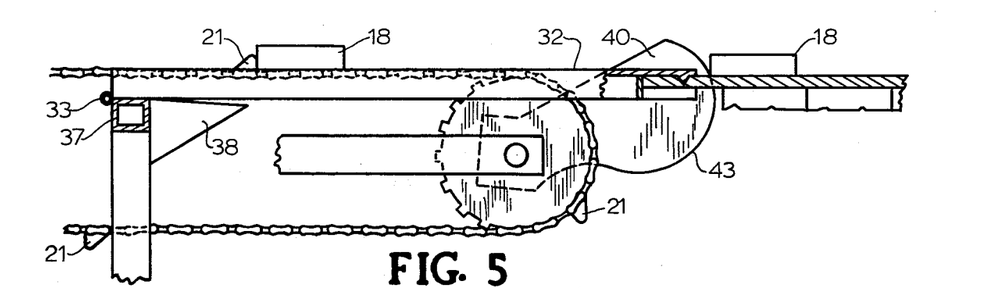
FIG. 5 is a view similar to FIG. 4 with the cam shown immediately before the cam surface line of contact loses contact with the board lower edge-corner.

Cam discs 40 propel boards 18 from deck 22 onto the upper surfaces of a series of horizontal stick holders 32 and then onto the respective layer of spacing sticks 36. The stick holders 32 serve as a means of holding the spacing sticks 36 in place during the stacking operation and serve the further function of supporting the boards as they move from deck 22 onto the spacing sticks. In this regard, it should be noted that the spacing sticks 36 serve as runners or guide rails to support the boards as each layer is being formed and also serve to space the layers of boards in the package of lumber. As shown in FIG. 5, cam discs 40 are just long enough to propel the boards 18 off of the stick holders 32 and onto the spacing sticks 36. As each layer is being formed, the board in contact with the cam discs 40 pushes each board in front of it along until the completed layer is formed on the spacing sticks 36.

Figure 9:
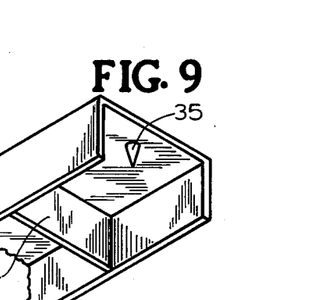
FIG. 9 is an enlarged bottom perspective view of the end of a stick holder showing the stop member and retaining barb.

In the specific embodiment, stick holders 32 are formed from three inch wide channel pieces having a length of approximately twenty inches. Stick holders 32 are pivotally mounted on a horizontal support member 37 by hinges 33. When not engaging the spacing sticks, the stick holders are held at an angle slightly below horizontal by means of triangular support stops 38 which are welded or otherwise secured to support members 37. As explained below, during the stacking operation the ends of stick holders 32 are raised somewhat by the spacing sticks so that the stick holders are substantially horizontal at a level slightly below the elevation of the chains 19. Thus, the portions of the stick holders 32 extending outwardly beyond the sprockets 25 form a horizontal support surface on which boards 18 are supported while the boards are being propelled forwardly by cam discs 40. As best shown in FIG. 9, the remote end of each stick holder 32 includes a stop member 34 for limiting the insertion of the spacing stick to approximately two inches. A retaining barb 35 is provided for piercing the spacing stick and holding it in place during the stacking operation.

Figure 6:
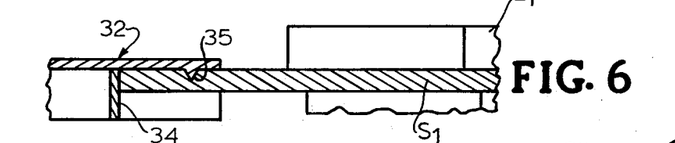
FIG. 6 is a further enlarged fragmentary side view of one of the stick holders shown securing a stacking stick as a layer of boards is being formed.
Figure 7:
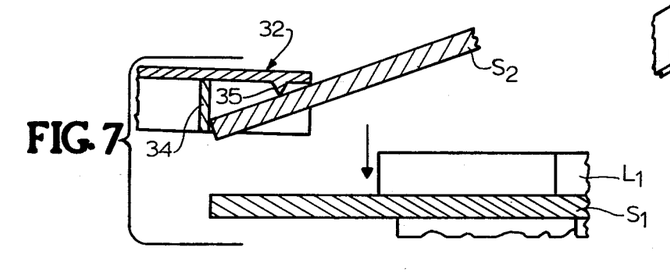
FIG. 7 is a view similar to FIG. 6 shown after a completed layer of boards has been moved downwardly allowing the insertion of the stacking sticks for the next layer of boards.
Figure 8:
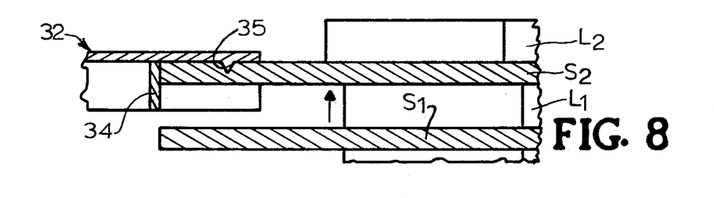
FIG. 8 is a view similar to FIGS. 6 and 7 with the completed layer of boards raised to bring each stacking stick into locked engagement with its respective stick holder.

With reference to FIGS. 6–8, the utility of stick holders 32 and spacing sticks 36 will be described. FIG. 6 shows a stick holder 32 and a spacing stick 36 in the horizontal positions they assume as a layer of boards, $L_1$, is being formed upon a series of spacing sticks, one of which is identified as $S_1$. The end of spacing stick $S_1$ abuts stop member 34 and is retained by barb 35 which prevents the stick from moving away from the cams due to the frictional force created when the boards slide over the stick. FIG. 7 shows the same elements after layer $L_1$ has been completed and the stacker base 50 has been indexed downwardly preparatory to beginning the next layer of boards. One of the spacing sticks $S_2$ for supporting the next layer of boards is being inserted. Each stick holder 32 is resting on its respective stop 38. FIG. 8 shows the position after the stacker base has been moved upwardly to a position where spacing stick $S_2$ has engaged stick holder 32 and has raised the stick holder to a horizontal position. The stick holder 32 is preferably made from a relatively heavy material so that the weight of the stick holder exerts a sufficient downward force on spacing stick $S_2$ to enable barb 35 to penetrate the surface of spacing sticks $S_2$. In this position, spacing stick $S_2$ is held in place by barb 35 and essentially forms a horizontal continuation of stick holder 32 so that the next successive layer of boards $L_2$ may be formed. The above sequence is repeated until a package of lumber having a desired number of layers is formed.

Although not a part of the present invention, it should be mentioned that one end of each board 18 moving along deck 22 is driven against an even-end stop member 29 so that the final package of lumber will have a regular shape. The boards are driven to stop member 29 by a series of even-end rollers which are well known in the art and, therefore, are not illustrated and will not be discussed.

Figure 2A:
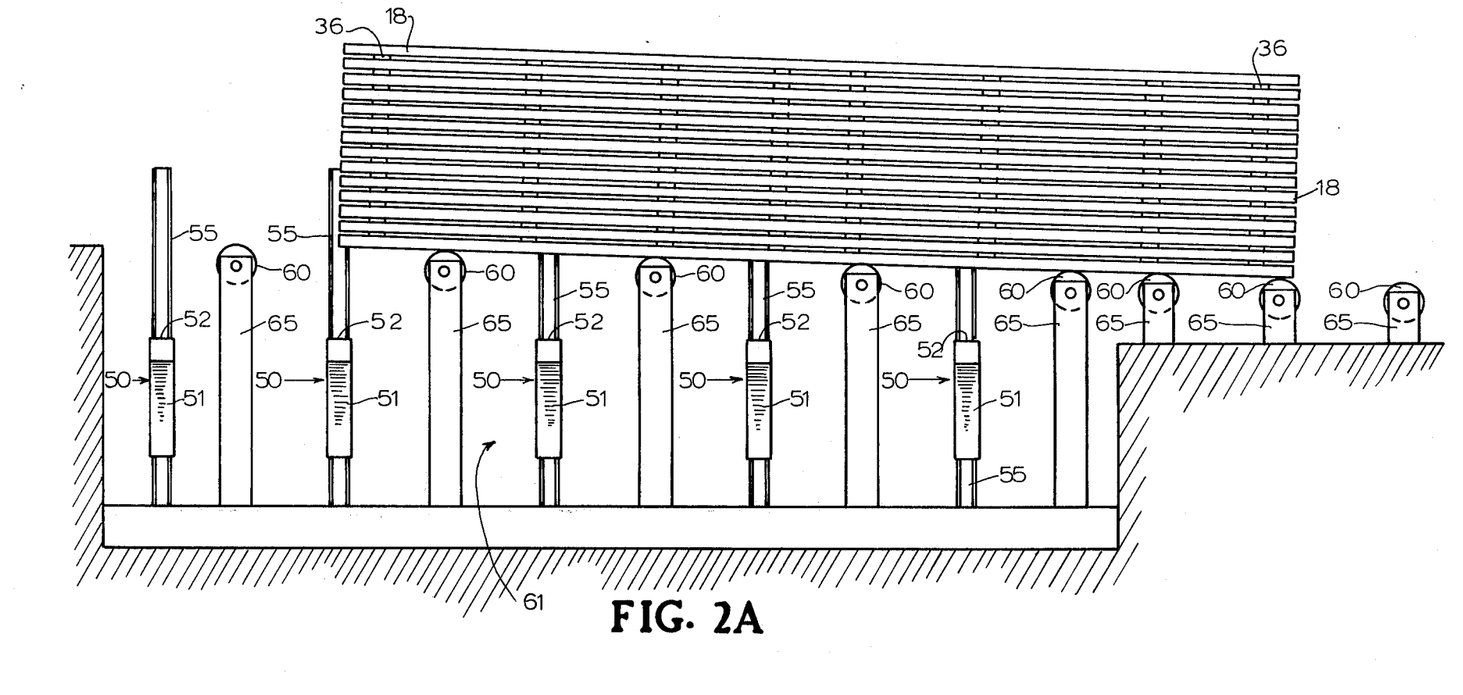
FIG. 2A is a view taken substantially along line 2A—2A of FIG. 2 showing the ends of the rollers as they are positioned above the pit and showing a completed package of lumber being rolled away from the stacking apparatus.

The apparatus for removal of the completed package of lumber from the stacker base 50 will now be described with reference to FIGS. 2 and 2A. Once the package is complete, the stacker base 50 is lowered until the bottom layer of boards is supported by a series of rollers 60. Rollers 60 are mounted on spaced vertical supports 65 and are inclined downwardly in the direction shown in FIG. 2A. The stacker base cantilevered support arms 51 are interspaced between the roller supports 65 so that the stacker base may be lowered below the level of the rollers 60 thereby depositing the package onto the rollers. A preferred angle of inclination for the rollers is 2.5°, with 1° – 5° being a workable range. The rollers extend downwardly from the stacker pit 61 a sufficient distance so that the completed package may be rolled clear of the stacking apparatus 30 and a new package may be started while the completed package is being hauled away for seasoning. A braking system (not shown) is provided on the rollers 60 so that the package will not roll away until the operator releases the brake.

In the operation of the present invention, a bulk supply of boards 18 is placed upon deck 11 and the apparatus is energized thereby driving the conveyor on deck 11, chains 19, and cam discs 40. Boards 18 fall into the V-shaped portion of unscrambler 20 where they are individually picked up by the evenly-spaced lugs on chains 19. The boards move along deck 22 by means of chains 19 in a direction transverse to their longitudinal axes. At the terminal edge 23 of deck 22 the boards are propelled forward by cam discs 40 onto the stick holders 32 and then onto the spacing sticks 36. When a layer of boards is completed, the rotation of drive shaft 26 is momentarily stopped while the stacker base 50 is lowered. A new set of stacker sticks 36 are inserted into the stick holders 32 and the next layer of boards is formed. Once a complete package of lumber is formed, the package is rolled away from the stacking apparatus 30 on rollers 60.

Broadly stated, a method of stacking lumber according to the present invention includes the following steps:
1. Conveying evenly spaced individual boards in a direction transverse to their longitudinal axes across a substantially horizontal deck.
2. Rotatably mounting at least two spaced cam discs at the terminal edge of the deck.
3. As the individual boards reach the terminal edge of the deck, engaging the trailing edge of each successive board with curved camming surfaces on the cam discs and imparting a resultant force to the board at an angle downward from the horizontal.
4. Propelling the first such boards forward onto a stacker base to form a first layer of boards.
5. Indexing the stacker base downwardly.
6. Placing a plurality of stacking sticks laterally across the formed layer of boards.
7. Securing the ends of the stacking sticks proximate the cam discs.
8. Completing a second layer of boards upon the stacking sticks.
9. Releasing the secured ends of the stacking sticks supporting the second layer of boards.
10. Indexing the stacker base downwardly and forming successive layers of stacking sticks until a package of lumber having a desired number of spaced layers of boards is formed.

It should be pointed out that although four cam discs are shown in the preferred embodiment, satisfactory operation of the invention requires the use of only two cam discs. For optimum operation, the number of cam discs may be increased or decreased according to the length of the boards being stacked. For example, as shown in the illustrated embodiment, it has been found that the use of four cam discs is ideal for stacking lumber between 16 and 20 feet long. Of course, the optimum number of cam discs will also vary with the size of the discs, the thickness of the boards and the torque exerted by each cam disc. Also, it should be noted that the invention has been described with the cam discs propelling one board at a time. It is possible that an aligned set of lugs may pick up more than one board and that the cam discs may, therefore, propel such boards simultaneously by engaging the trailing edge of the last board. Thus, the term "individual board" and like terms are used to describe either one board or a number of side-by-side boards which are being simultaneously conveyed transverse to their longitudinal axes toward the cam discs.

What is claimed is:

1. In a lumber stacking apparatus of the type having a vertically movable stacker base for receiving individual boards to form layers of several boards each, said layers being stacked to form a package with successive layers being separated by a series of stacking sticks running laterally across each layer of boards, a push-on apparatus for propelling individual boards onto the package to form the successive layers and for holding the uppermost stacking sticks during stacking, said apparatus comprising:
   a. a substantially horizontal deck having means for conveying evenly spaced apart individual boards in a direction transverse to their longitudinal axes and said deck having a terminal edge portion for discharging such boards to a selected lumber handling operation;
   b. rotatable cam means proximate said deck terminal edge for engaging the trailing edge of the respective individual boards and propelling said boards forward onto said stacking base, said cam means comprising at least two spaced apart and vertically oriented disc members mounted for rotation on a horizontal drive shaft oriented perpendicular to the direction of lumber movement and located below said deck at a position proximate said deck terminal edge, each said disc member having major and minor axes such that during a fractional part of each revolution thereof a selected portion of said disc member on said major axis protrudes above said deck, said selected disc portion having a forwardly facing curved camming surface for engaging the trailing edge of each said evenly spaced apart individual board as it approaches said terminal edge, said curved camming surface having a shape designed to impart a resultant force on the board trailing edges at an angle downward from horizontal; and
   c. a plurality of releaseable stick holders corresponding to the desired number of stacking sticks separating each layer in the package, each such holder being adapted to hold the marginal end portion of one of the uppermost stacking sticks during the forming of the layers of lumber, whereby said stacking sticks may be held securely in place to serve as runners for supporting and guiding the individual boards as the boards are pushed forward to form the successive layers and may be released following the formation of the layer to serve as spacers between the layers of boards.

2. An apparatus as claimed in claim 1 wherein said means for conveying the evenly spaced apart boards along said horizontal deck comprises drive chain means having evenly spaced lugs thereon for engaging and driving the trailing edge of the boards, said chain means being driven by sprockets rotatably mounted on said horizontal drive shaft for common rotation with said cams, said lugs being spaced apart by a distance equal to the circumference of one of said sprockets so that a board will be located in the same position proximate said deck terminal edge each time said cam curved surface emerges above the deck to propel such board.

3. An apparatus as claimed in claim 1 wherein said curved camming surfaces have a shape designed to impart a resultant force on the board trailing edges at an angle of approximately 25° downward from horizontal.

4. An apparatus as claimed in claim 1 wherein said stacker base comprises a plurality of spaced cantilevered support arms having aligned top surfaces, said arms being vertically movable in a pit area.

5. An apparatus as claimed in claim 4 wherein said pit area includes a plurality of elongated rollers located between said stacker base support arms, said rollers being mounted at progressively lower levels so as to form a roller conveyor for rolling packages of lumber away from said pit area, said support arms being movable to a position where their aligned top surfaces are below the level of said rollers thereby enabling a completed package of lumber to be deposited on said rollers for conveyance thereon away from said pit area.

6. In a lumber stacking operation of the type in which layers of several boards each are stacked on a vertically movable stacker base to form a package with successive layers being separated by a series of stacking sticks running laterally across each layer of boards, a push-on method of propelling individual boards to form the successive layers, comprising the steps of:
   a. providing a vertically movable stacker base for receiving the successive layers of boards thereon;
   b. conveying evenly spaced apart individual boards in a direction transverse to their longitudinal axes across the upper surface of a substantially horizontal deck which terminates at a point adjacent to and above said stacker base;
   c. mounting at least two spaced apart and vertically oriented cam discs for being rotatably driven about a horizontal axis oriented perpendicular to the direction of board conveying and said horizontal axis being located at a level below said deck upper surface, each said cam disc having a forwardly disposed curved camming surface along a major axis thereof, said camming surface protruding above said deck upper surface during a portion of each revolution of the cam disc;
   d. rotating said cam discs about said horizontal axis and synchronizing such rotation with the conveying of said evenly spaced apart boards so as to engage the trailing edge of each successive board with said curved camming surfaces thereby imparting a resultant force to each such board at an angle downward from horizontal and propelling such board onto its respective layer;
   e. propelling a predetermined number of boards forward onto said stacker base to form a first layer of boards;
   f. indexing said stacker base downwardly;
   g. placing a series of stacking sticks above the formed first layer of boards preparatory to propelling additional boards thereon to form the next successive layer and securely holding such stacking sticks at their respective ends proximate the cam discs for the period of time during which such next successive layer is being formed, whereby said stacking sticks may be securely held at their ends to serve as runners for supporting and guiding the boards as the successive layer is formed and may be released following the formation of the layer to serve as spacers between the formed layers of boards; and
   h. conveying additional boards over said deck and propelling such boards onto stacking sticks held above the immediately preceding layer to form additional layers of boards spaced by said stacking sticks and repeating such stacking operation until a package of lumber having a desired number of layers is formed.

* * * * *

UNITED STATES PATENT OFFICE
CERTIFICATE OF CORRECTION

Patent No. 4,054,211　　　　　　　　Dated October 18, 1977

Inventor(s)　　　Kemper N. Moseley

It is certified that error appears in the above-identified patent and that said Letters Patent are hereby corrected as shown below:

Col. 1, line 17, Second occurrence of "of" should be --on--.

Col. 1, line 25, "by" should be --to--.

*Signed and Sealed this*

*Seventh* Day *of February 1978*

[SEAL]

Attest:

RUTH C. MASON　　　　　　　LUTRELLE F. PARKER
*Attesting Officer*　　　　*Acting Commissioner of Patents and Trademarks*